United States Patent [19]

Eigenmann

[11] 4,148,561
[45] * Apr. 10, 1979

[54] METHOD FOR PRODUCING IMPROVED RETROREFLECTIVE SYSTEM FOR SIGN SURFACES, AND IMPROVED SYSTEMS PRODUCED THEREBY

[76] Inventor: Ludwig Eigenmann, Vacallo, Ticino, Switzerland

[*] Notice: The portion of the term of this patent subsequent to Sep. 21, 1993, has been disclaimed.

[21] Appl. No.: 798,100

[22] Filed: May 18, 1977

[30] Foreign Application Priority Data

May 19, 1976 [IT] Italy .............................. 23390 A/76

[51] Int. Cl.² ........................................... G02B 5/128
[52] U.S. Cl. ..................................... 350/105; 350/97; 404/14
[58] Field of Search ................. 350/105, 104, 97, 103; 404/12, 13

[56] References Cited

U.S. PATENT DOCUMENTS

| | | | |
|---|---|---|---|
| 3,874,784 | 4/1975 | Eigenmann | 350/105 |
| 3,964,821 | 6/1976 | Eigenmann | 350/105 |
| 3,981,557 | 9/1976 | Eigenmann | 350/104 |
| 4,049,337 | 9/1977 | Eigenmann | 350/105 |

FOREIGN PATENT DOCUMENTS 1443618  7/1976  United Kingdom .................... 350/105

Primary Examiner—John K. Corbin
Assistant Examiner—B. Wm. de los Reyes
Attorney, Agent, or Firm—Michael J. Striker

[57] ABSTRACT

A light retroreflective system essentially of the kind described in the U.S. Pat. No. 3,981,557, comprising a primary focusing transparent body having elliptical sections in planes perpendicular to a rotary symmetry axis of such body, and an equatorial zone about such axis, the system being noted by having a multilayer of complemental reflective means comprising microspheres concentrated on said equatorial zone. There also described a method for producing said system and including rotarily mixing bodies of such geometrical configuration together with an amount of microspheres less than that necessary for forming monolayers all about the entire surfaces of said bodies.

9 Claims, 5 Drawing Figures

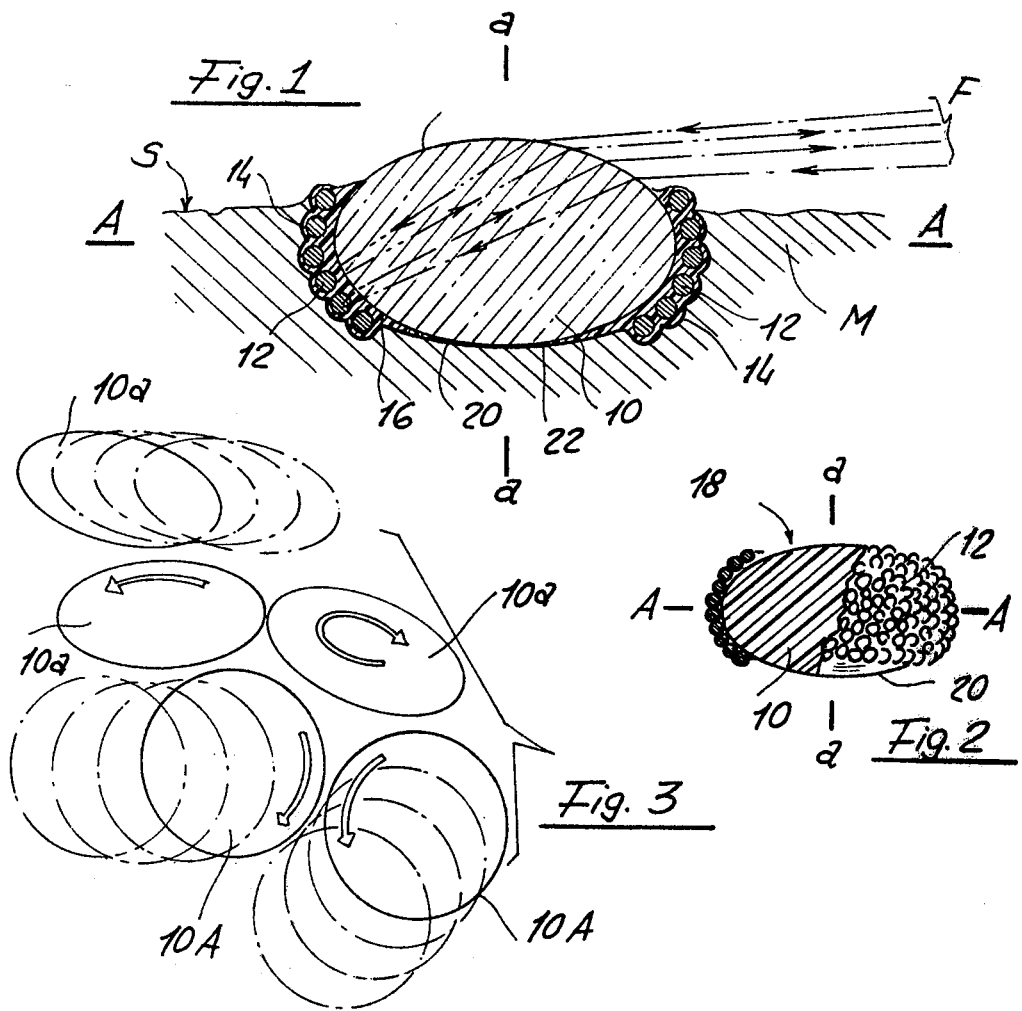
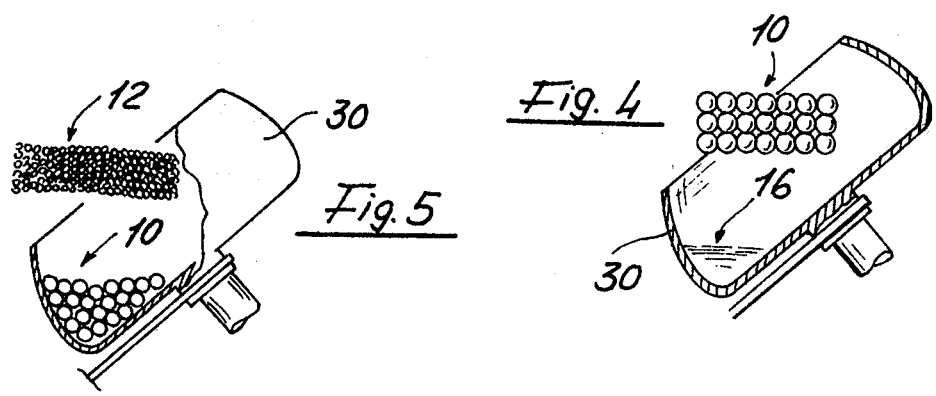

METHOD FOR PRODUCING IMPROVED RETROREFLECTIVE SYSTEM FOR SIGN SURFACES, AND IMPROVED SYSTEMS PRODUCED THEREBY

BACKGROUND OF THE INVENTION (a) The Field of the Invention

This invention is concerned with the art of producing light reflective systems particularly adapted for being utilized in highway marking signs and advertising signs to provide a distinguishing surface and capable of reflecting light from sources as headlight beams, for ensuring visibility at a distance in nighttime. The term retroreflection is hereinafter used to designate a reflective means, element or system which will reflect an incident beam or ray of light in such a manner that a brilliant beam, generally a cone of light, is returned to the source of light even though the incident light strikes the surface of the retroreflective system at an angle.

The invention is particularly concerned with retroreflective systems of the class described in my prior Pat. No. 3,981,557 of the U.S., issued on Sept. 21, 1976.

(b) The Prior Art

The pertinent prior art of this invention is throughoutly described and defined in the above my U.S. Pat. No. 3,981,557, the entire disclosure of which is herein referred to and forms part of this specification, including the several details concerned with the materials, the ranges of index of refraction, the combination and the arrangement of the various components and the modes for making use and taking advantages of said retroreflective systems.

As far as this improvement is specifically concerned, attention can be paid to the illustration of FIG. 2, of my above prior U.S. Patent. There is shown how an incident light beam (which actually forms an angles smaller than that illustrated in said FIG. 2 with the sign surface indicated at S) is retroreflected by one or more reflectorized bead or microsphere such as indicated at 12, located close to said surface S. Taking into in consideration that the light to be retroreflected is the "grazing light", the part of interest of the microspheres is that located in the zone adjacent to the plane defined by said surface, that is the zone which can properly be termed as the "equatorial zone" of the primary focusing transparent body, generally indicated at 10 and having its unique elliptical or nearly elliptical configuration in its sections taken in planes perpendicular to the said sign surface, as claimed.

As shown in FIG. 1 of said prior Patent, the retroreflective composite element is produced, by applying the prior art, as comprising the said primary transparent body and a monolayer of microspheres which completely covers the surface of said body.

As a matter of fact, the beads or microspheres which coat the upper half of said surface (when the system is in service, FIG. 2) must be removed, and therefore wasted, and those which coat the lower portion of the lower half of same surface (where generally a light beam to be reflected will be never focused) are simply useless for the desired retroreflection. Generally speaking, it might be assumed that not more that twenty percent about of the microspheres is actually useful for retroreflection, out from those existing in the manufactured arrangement.

SUMMARY OF THE INVENTION

It is therefore an object of this invention a new method for producing a retroreflective arrangement generally having a combination of components which can be generally compared with that of the above referred by prior U.S.A. Pat. No. 3,981,557, but by which a new system is produced, said new system being characterized by being provided with an annular monolayer of reflectorized microspheres located about an secured to the equatorial zone of the essentially elliptically cross-sectioned primary transparent body only, that is only where such complemental reflective means are actually necessary for retroreflection.

The new method comprises a step for arranging the microspheres about the primary body by mixing bodies and microspheres into a rotary mixer and taking advantage of the quite surprising effect that such microspheres will, upon the mixing action, be located selectively on the said equatorial zone only at least in the very substantial statistical occurrence.

An object of this invention is therefore also the provision of a new and improved retroreflective arrangement for use in a sign having an exposed surface, comprising a body of transparent material and having a generally elliptical configuration in all its sections taken in planes perpendicular to the surface of said sign surface and an equatorial zone containing its mayor sectional plane parallel to said surface, and a monolayer of or comprising reflectorized microspheres localizedly positioned in and bound to said body at said equatorial zone, and surface portions symmetrically located at either sides of said equatorial zone not covered by said microspheres.

These and other features and advantages of the invention will be made apparent from the following detailed description of a preferred embodiment of same invention, taken in conjunction with the accompanying drawing.

BRIEF DESCRIPTION OF THE VIEWS OF THE DRAWING

FIG. 1 is a sectional view illustrating in greatly enlarged scale and in a rather diagrammatical manner an improved retrorefractive system as associated to a prefabricated tape material for surface road marking, said FIG. 1 being best understood when compared with the said FIG. 2 of the prior U.S. Pat. No. 3,891,557;

FIG. 2 is partially a side view and partially a sectional view of the article of FIG. 1;

FIG. 3 is a purely diagrammatical illustration of the phenomena which might explain the fact that articles as shown in FIG. 2 are produced upon mixing primary bodies and beads (or microspheres) in a rotary mixer, as shown in FIGS. 4 and 5, which are view corresponding to FIGS. 7(A) and respectively 7(B) of my prior U.S. Pat. No. 3,874,748, issued on Apr. 1, 1975, and which indications about the production of retroreflective articles of the considered class can be had.

DETAILED DESCRIPTION OF THE PREFERRED EMBODIMENTS

Referring now to the FIGURES of the drawing, wherein the various components and elements of the arrangement are indicated by reference numerals and letters corresponding to those made use of for referring equivalent elements in the said prior Pat. No. 3,981,557, for comparison facilitation, there is shown an article comprising a primary transparent, ovoid body 10 (reference to said prior patent is made for further details) of essentially elliptical configuration in its sections perpendicular to the plane generally defined by the surface S of the sign, that is of the upper face of the tape material M of which the sign is formed (according to the art). Said sections intercross in the axis a—a of the body 10, the greatest section of which is contained in the generally horizontal plane A—A of symmetry of the body 10. Said plane A—A can be properly termed as the "equatorial plane" of the body and the annular zone of its surface, extended at either sides of said equatorial plane, for width well less that the thickness (in the direction of axis a—a) of same body, can be termed as the "equatorial zone". The curvature of the surface of the body 10 has its lesser radii at said equatorial zone. The remaining parts of said surface (or greater radii of curvature) comprise a nearly flattened upper dome-shaped portion 18 and a symmetrical dome-shaped lower portion 20.

In service, the arrangement has its said upper portion 18 bulging above the sign surface S and exposed for light impingement. A group of arrows F indicate on FIG. 1 a beam of impinging and retroreflected light. This retroreflection can be squared with that diagrammatically illustrated in FIG. 2 of said my prior U.S. Pat. No. 3,981,557. From such comparison it is readily evident that, from the point of view of retroreflection of grazing light (such that indicated by arrows F) that is of the retroreflection of interest, the complemental or secondary reflective means comprising microspheres 12 reflectorized by a metal or otherwise reflective coating 14, are those located about the said equatorial zone only, as shown.

An article such as examplificatively illustrated in FIG. 2, therefore, provides a number of advantages in comparison with that of the above discussed prior art; namely:

(a) it comprises a great deal fewer costly microspheres 12, when manufactured (FIG. 1 of U.S. Pat. No. 3,981,557);

(b) it has an uncoated upper face 18 for light impingement. More properly, said face 18 has not, as produced, a coating monolayer of microsphere thereon, but a thin layer of the reflective coating, said thin coating being promptly removed say by the wearing off exerted by the vehicle traffic on the articles on the road;

(c) the fact that the lower face 20 has not beads applied thereto provides an article of substantially more flattened configuration and which when partially embedded in the material M, according to the art, can be properly secured into a thinner material M, while being most efficiently an desirably firmly secured on the road;

(d) the above more flattened overall configuration similar to that of a lens having a "crown" of beads therabout facilitates the arrangement of articles on the still rather fluid surface of the material M (also according to the art). By causing articles to fall from above on the receptive surface of the tape material, the most of said articles will statistically set themselves horizontal thereon.

Surprisingly, it has been found that articles such as shown in FIG. 2 can be produced by a simple adaptation of the technique made use of for currently mass producing generally round retroreflective articles comprising a spherical transparent body and a monolayer of reflectorized beads thereabout. The essential steps of such technique are diagrammatically shown in FIGS. 4 and 5 and form part of the art taught in my other prior U.S.A. Pat. No. 3,874,784. In said FIG. 4 there is shown a rotary mixer 30 wherein a proper amount of globular bodies 10 is supplied together with a proper amount 16 of a suitable known fluidized transparent binder are prepared for having the surface of each body made receptive for the beads. In FIG. 5 there is shown the same (or similar) mixer 30 being prepared for processing the required amount of now receptive bodies 10 by throughoutly mixing the same with a proper proportional amount of beads 12 for having a substantially homogeneous monolayer of beads formed about all individual bodies 10. This art is known and does not require further analysis.

It has been quite unexpectedly and unforeseenably found that by processing, such as shown in FIG. 4, a number of sectionally elliptical bodies 10, as above described, and then mixing the same, as shown in FIG. 5, with a suitably selected amount of beads 12, provided that such selected amount will preferably correspond to an amount less than that necessary for completely coat the bodies, and most preferably corresponding to that occurring for having their equatorial zones coated only, articles such as that shown in FIG. 2 can be provided and produced.

The Applicant has investigated about this surprising result. A rather reasonable explanation follows with reference to FIG. 3, but the Applicant is not intended to be bound to such explanation. The bodies 10 having the above considered geometry are round in their principal or greatest symmetry sectional plane A—A (see the bodies indicated at 10A in FIG. 3) but elliptical in any other sectional plane including their symmetry axis a—a (see the bodies indicated at 10a).

Assuming now that a number of such bodies are mixed in a rotary mixer (such as at 30 in FIGS. 4 and 5) with a number of beads (not shown in FIG. 3, for simplicity, and where such beads do not contribute for the assumed phenomenon), the more or less coated body will abut to each other and revolve in the mixer environment. Statistically, some bodies will contact to each other at their quite round or circular surface portions (see adjacent bodies 10A) and can rollingly engage without substantial friction. Other bodies will engage with each other at their not circular surface portions and will not properly roll each about the other but slidingly relatively displace, causing a substantial frictional engagement.

Now it can be believe that beads being tending to adhere to the adjacent body surface will be unaffected by a rolling engagement and contact and mature into well bound beads, while those transiently positioned where a frictional engagement occurs will not remain thereat, so that, upon a proper mixing time, all or nearly all the beads will firmly adhere on and about the bodies equatorial zones only.

I claim:

1. A retroreflective arrangement for use in a sign having an exposed surface through which a beam of light enters and through which the beam is subsequently retroreflected, the arrangement comprising a substantially avoid transparent body having an index of refraction less than 1.9 and having a longitudinal major axis and a diametrical minor axis which is perpendicular to the major axis, said transparent body comprising an outer surface including two polar regions each at one of the extremities of the minor axis, and an equatorial region intermediate said two polar regions; and monolayer of retroreflective means on said body and concentrated about the equatorial region of said body.

2. The arrangement of claim 1, one of said polar regions being uncovered by the material of the sign, the other of said polar regions being axially spaced below said one polar region and being embedded in the sign, said transparent body defining a predetermined distance from the major axis to the minor axis extremety meeting said other polar region, said monolayer extending downwardly from the extremities of the major axis in a direction for a distance substantially equal to the predetermined distance, whereby the ovoid transparent body is included in an arrangement having a relatively flat bottom surface.

3. The arrangement of claim 1, said monolayer of retroreflective means extending around and at least substantially covering said transparent body in said equatorial region while said two polar regions are substantially free of said retroreflective means.

4. The arrangement of claim 1, said monolayer of retroreflective means being connected to portions of the outer surface of said transparent body at each of the extremities of the major axis, whereas portions of the outer surface at each of the extremities of the minor axis are substantially free of said retroreflective means.

5. The arrangement of claim 1, further comprising a transparent binder connecting said monolayer to said equatorial region.

6. The arrangement of claim 1, said retroreflective means comprising a plurality of microspheres.

7. The arrangement of claim 6, said retroreflective means further comprising a frictionally removable reflectorized film covering said monolayer on said equatorial region and also covering said polar regions.

8. The arrangement of claim 7, further comprising sign forming material covering said film, said monolayer, said equatorial region and one of said two polar regions, while the other of said two polar regions is substantially free from coverage by said sign forming material, whereby said sign forming material protects said monolayer and protects reflectorized film covering said monolayer and covering said one polar region from being worn away.

9. The arrangement of claim 8, said sign forming material forming an outer surface leaving said other polar region substantially exposed to incident beams of light, the major axis of the transparent body being substantially parallel to the outer surface of said sign forming material.

* * * * *